United States Patent Office 3,229,780
Patented Jan. 18, 1966

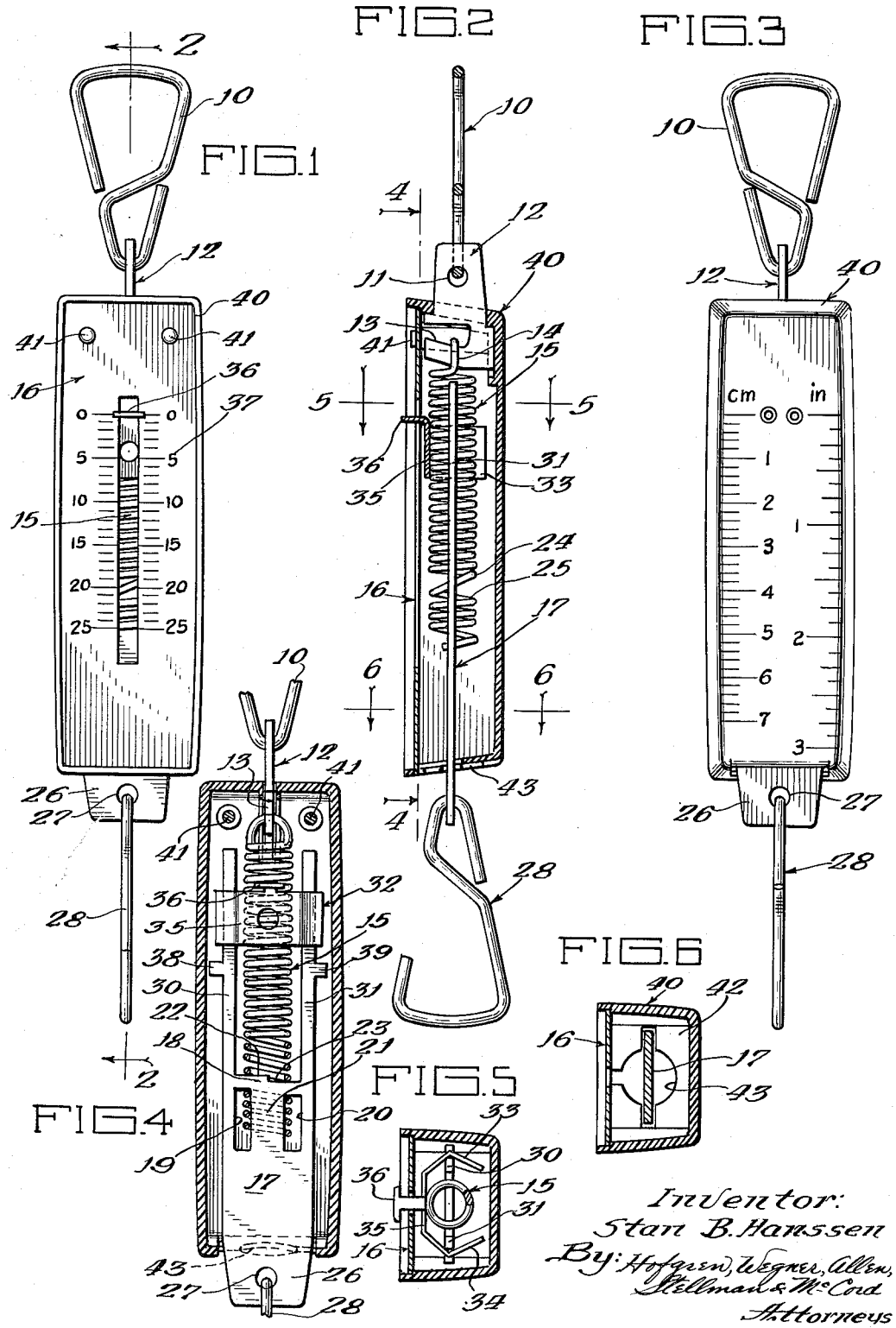

3,229,780
CALIBRATED SPRING WEIGHING SCALE
Stan B. Hanssen, Kenilworth, Ill., assignor to Hanson Scale Company, a corporation of Illinois
Filed Apr. 3, 1964, Ser. No. 357,125
2 Claims. (Cl. 177—233)

This invention relates to a calibrated spring weighing scale and more particularly to a novel arrangement of parts in such a scale whereby a person may easily make an adjustment for the weight of a container for receiving matter to be weighed, such adjustment generally referred to as a tare adjustment.

The invention will be described as embodied in a relatively small, direct spring calibrated weighing scale of the type which is capable of supporting a pan suspended from the scale in order to weigh items such as produce. The capacity of the particular scale which will be described is from zero to twenty-five pounds, giving an indication of the size of the scale in which the invention will be described.

Spring scales utilize a coil spring which has an extension in a direct line proportion to the amount of weight applied to it. The springs are made in a long length, but the scale uses a finite length or calibrated portion of the spring. When a container is suspended from such a scale for receiving matter to be weighed, it is often desirable that the scale read zero with the container in place. This invention provides a readily adjustable means to permit such operation.

It is the primary object of this invention to provide a new and improved calibrated spring weighing scale.

A further object is to provide a novel means for making an adjustment in the indicated weight of a scale to provide for the weight of receiving pans or similar structures for receiving the material to be weighed.

A further object of the invention is to provide a novel combination of parts by which a calibrated spring scale may have increased utility and use.

Other objects, features and advantages of the present invention will be apparent from the following description of a preferred embodiment illustrated in the accompanying drawings, in which:

FIGURE 1 is a front elevational view of a scale embodying the invention;

FIGURE 2 is a central sectional view through the scale taken substantially along line 2—2 in FIGURE 1;

FIGURE 3 is a back plan view of the scale;

FIGURE 4 is a fragmentary front sectional view through the scale taken substantially along line 4—4 in FIGURE 2;

FIGURE 5 is a horizontal sectional view through the scale taken substantially along line 5—5 in FIGURE 2; and FIGURE 6 is a horizontal sectional view through the scale taken substantially along line 6—6 in FIGURE 2.

The scale of the present invention is intended to be hung from a stationary part of a building, platform, framework or the like by a bail 10 threaded through the eye 11 of a support plate 12. The entire scale parts as well as that material to be weighed are supported from the support plate 12 which remains stationary with whatever the bail 10 is associated. The plate 12 is provided with a hook 13 on which an upper finger 14 of a coil spring 15 is caught. The coil spring 15 is an elongated spring having generally the characteristic of a straight line relationship of extension in proportion to the load applied to the spring. The spring is ordinarily made considerably longer than necessary for the particular measurement to be made.

In order that the calibrated spring may be properly adjusted for the proper length making the spring extend in accordance with the gradation shown upon a dial or scale face 16, a calibrating member is threaded into the coils of the spring to give it a finite operative length. In the present invention the calibrating member is a sheet metal stamping 17 formed in a particular manner to receive the coils of the spring 15. Referring to FIGURE 4, the calibrating member 17 has a central bar 18 with openings 19 and 20 below the bar on either side of a central web 21. The bar has a left-hand upper edge 22 and a slightly lower right-hand edge 23 as viewed in FIGURE 4. The upper extents of the openings 19 and 20 are similarly spaced so that the bar 18 has a generally constant width where the coils of the spring may engage the bar. As viewed in FIGURE 2, the coils of the spring may be threaded around the bar 18 which will cause the coils 24 above the bar to be extended or expanded away from the coils 25 below the bar. The effective length of the spring will be from the bar to the spring support member 12.

The calibrating member also extends downwardly to a lower portion 26 having an eye 27 to support a bail 28 upon which a pan, platform or other device may be supported to receive matter intended to be weighed. The portion of the calibrating member above the bar 18 is intended to support the indicating mechanism.

In the present invention the calibrating bar is equipped with a pair of side rails 30 and 31 on diametrically opposite sides of the coil spring 15 and extending generally beside the spring. These rails are intended to support an indicator member 32 in sliding contact with the rails. As seen in FIGURE 5, the indicator member has a pair of opposite spring legs or fingers 33 or 34 with an intermediate portion 35 bridging or spanning the intermediate spring 15. The indicator member is made of spring steel so that the legs may frictionally embrace the rails 30 and 31 while permitting the same to be manually moved along the length of the rails. At one end of the intermediate portion 35 of the indicator, a telltale or upstanding part 36 extends outwardly from the indicator to give a visual indication opposite the indicia 37 on the scale face. The part 36 on the indicator also provides a finger piece by which an individual may slide the indicator along the rails, outwardly extending bosses 38 and 39 on the rails preventing the indicator from being moved downwardly toward the lowered end of the scale more than a desired amount, namely when the spring legs engage the bosses.

The scale face is carried by a housing 40 supported directly from the spring support plate 12. A pair of studs 41 support the sheet metal scale face 16 in the housing 40. The calibrating member 17 extends outwardly through a bottom wall 42 in the housing, this wall being provided with a round opening 43 permitting the spring to extend out of the housing, should a sufficiently large weight be applied to extend the spring to this extent. Since the housing and the scale face are supported immovably on the spring support plate 12, the indicator member may be moved along the rails relative to the indicia 37 on the scale face. On the back of the scale housing 40 there is provided a measure in inches and centimeters as shown, sometimes useful in connection with such scales.

In operation, a party using the scale may place a pan on the lower hook 28 and then manually move the indicator member along the rails until the part 36 is opposite the zero indication. Thereafter, the scale will only indicate the weight of the matter placed in the suspended pan.

The foregoing detailed description has been given for clearness of understanding only and no unnecessary limitations should be understood therefrom as some modifications will be obvious to those skilled in the art.

I claim:
1. A calibrated spring weighing scale, comprising:
a spring support;
a calibrating coil spring secured to the support and extending generally away therefrom;
a calibrating member threaded into the coils of the spring providing a finite length of spring between the support and member, said calibrating member having a first portion extending along and out of contact with the spring comprising a pair of spaced rails beside and on opposite sides of the calibrating spring and a second portion for receiving matter to be weighed;
a face plate carried by the support in close proximity to the spring and calibrating member and having indicia along a path of spring extension during weighing;
an indicator carried by said calibrating member with a portion adjacent the indicia for visual indication of weighing, said indicator being slidably mounted on said first portion of the calibrating member by a spring clip base frictionally binding said indicator to said rails, said indicator base having opposed spring base fingers respectively engaging said rails and bridging the coil spring between, permitting manual adjustment of the indicator relative to the indicia.

2. In a calibrating spring weighing scale, a manual tare adjustment for the weight of a container for receiving matter to be weighed, comprising:
a length of calibrating spring supported at one end;
a calibrating member secured along the spring length and having means to support a container for matter to be weighed, said calibrating member having a pair of metal rails spaced to receive the spring between said rails;
a scale face supported adjacent the spring with indicia thereon;
and an indicator member carried by the calibrating member adjacent the scale face indicia, said indicator member having means frictionally gripping the calibrating member and permitting manual sliding thereof along the calibrating member relative to the indicia so that the indicator may be placed at zero indication with a container on the scale, said indicator member comprising a spring member having base legs respectively embracing said rails and bridging said spring with a manually engageable indicator portion exposed adjacent said scale face indicia.

References Cited by the Examiner

UNITED STATES PATENTS

| | | | |
|---|---|---|---|
| 28,838 | 6/1860 | Crowell | 177—233 |
| 326,067 | 9/1885 | Sturtevant | 177—233 X |
| 338,894 | 3/1886 | Watt | 177—231 |
| 629,290 | 7/1899 | Goodbaudy | 177—233 X |
| 1,052,023 | 2/1913 | Stevens | 177—233 X |
| 2,340,958 | 2/1944 | Hansen | 177—233 |
| 2,593,060 | 4/1952 | Schrader | 177—233 X |

FOREIGN PATENTS 2,470    8/1867    Great Britain.

LEO SMILOW, *Primary Examiner.*